(12) United States Patent
Niu

(10) Patent No.: US 10,120,118 B2
(45) Date of Patent: Nov. 6, 2018

(54) BACKLIGHT MODULE HAVING QUANTUM DOT AND MANUFACTURING METHOD THEREOF

(71) Applicant: AU OPTRONICS CORPORATION, Hsin-chu (TW)

(72) Inventor: Tzu-Ling Niu, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/785,716

(22) Filed: Oct. 17, 2017

(65) Prior Publication Data
US 2018/0128958 A1 May 10, 2018

(30) Foreign Application Priority Data
Nov. 4, 2016 (TW) .............................. 105135895 A

(51) Int. Cl.
*F21V 8/00* (2006.01)
(52) U.S. Cl.
CPC ........... *G02B 6/0051* (2013.01); *G02B 6/005* (2013.01); *G02B 6/0053* (2013.01); *G02B 6/0055* (2013.01)
(58) Field of Classification Search
CPC .... G02B 6/0051; G02B 6/0053; G02B 6/005; G02B 6/0055; G02B 6/003; G02B 27/22; G02F 2001/133614; G02F 1/133617; G02F 1/133; G02F 2001/133613; G02F 2001/133617; F21K 9/64
See application file for complete search history.

(56) References Cited

U.S. PATENT DOCUMENTS 5,719,649 A 2/1998 Shono et al.
7,688,511 B2 3/2010 Komatsu et al.
(Continued)

FOREIGN PATENT DOCUMENTS

CN 102768433 A 11/2012
TW 200933087 A 8/2009
(Continued)

OTHER PUBLICATIONS

Office Action issued by (TIPO) Intellectual Property Office, Ministry of Economic Affairs, R. O. C. dated Mar. 20, 2017 for Application No. 105135895, Taiwan.

*Primary Examiner* — Anh Mai
*Assistant Examiner* — Fatima Farokhrooz
(74) *Attorney, Agent, or Firm* — Tim Tingkang Xia, Esq.; Locke Lord LLP

(57) ABSTRACT

A backlight module has a light guide part, a light source, a reflection part, a grating, a prism sheet, a diffuser, a wavelength-conversion material, and a reflection layer. An incident surface of the light guide part is located on a lateral side between a bottom surface and a top surface. The light source is disposed on a side of the incident surface. The reflection part is disposed along the bottom surface. The grating is disposed along the top surface, and has bright zones and dark zones disposed with an equal pitch. A surface, next to the grating, of the prism sheet has micro structures. An angle is formed between a first wall and a second wall of a horizontal cross-section of a micro structure. The diffuser has a cave to enable the wavelength-conversion material to be disposed therein. The reflection layer is formed at a flat portion of the diffuser.

17 Claims, 11 Drawing Sheets

(56) References Cited

U.S. PATENT DOCUMENTS

| | | |
|---|---|---|
| 8,045,092 B2 | 10/2011 | Jeong et al. |
| 8,353,617 B2 | 1/2013 | Montgomery et al. |
| 8,905,613 B2 | 12/2014 | Niu et al. |
| 2009/0080215 A1 | 3/2009 | Anandan |
| 2009/0231831 A1 | 9/2009 | Hsiao et al. |
| 2014/0158982 A1* | 6/2014 | Park, II .................. G02B 6/005 257/13 |
| 2014/0233212 A1* | 8/2014 | Park .................. G02F 1/133606 362/84 |
| 2014/0268867 A1 | 9/2014 | Fiorentino et al. |

FOREIGN PATENT DOCUMENTS

| | | |
|---|---|---|
| TW | 200944840 A | 11/2009 |
| TW | 201024805 A | 7/2010 |
| TW | 201400948 A | 1/2014 |

\* cited by examiner

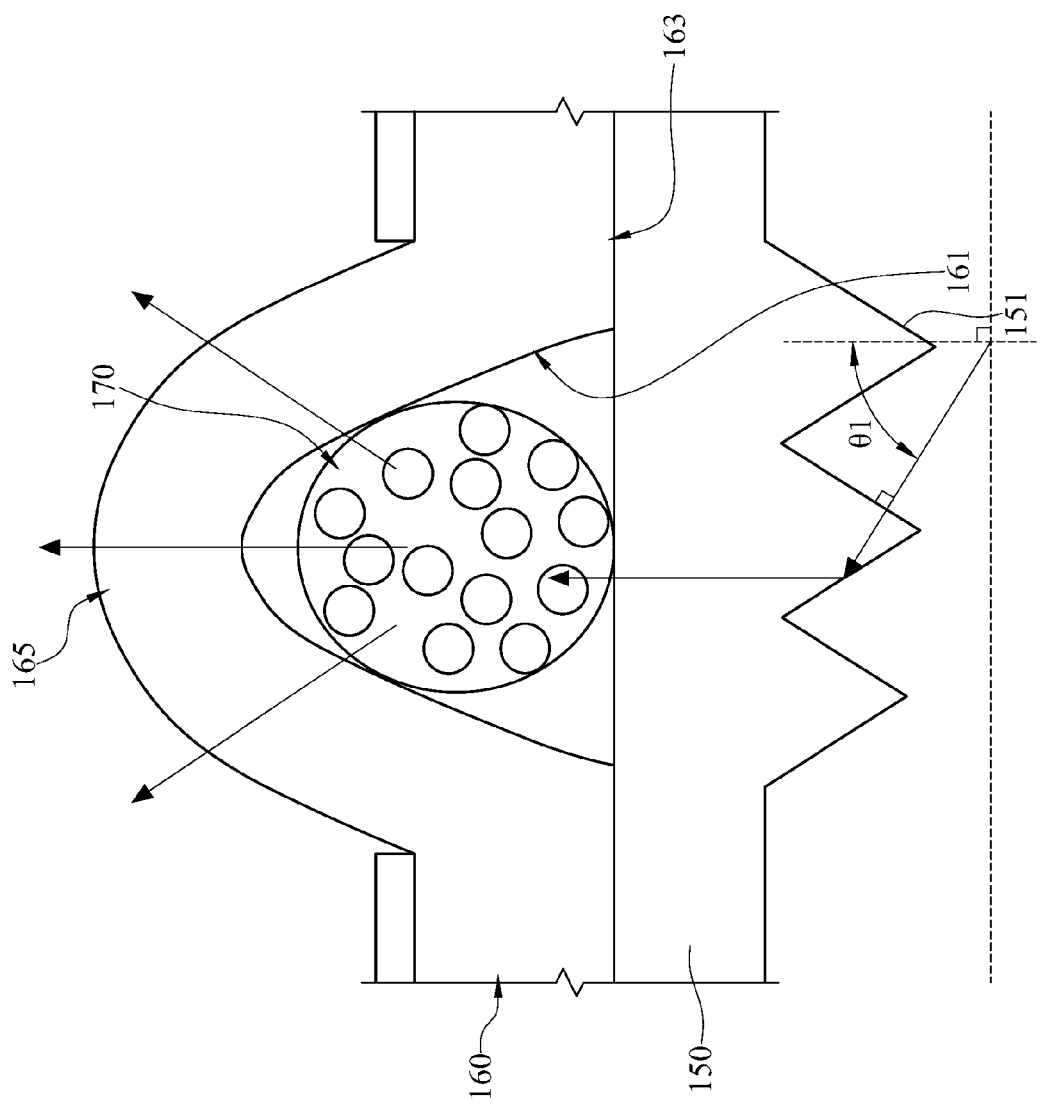

10,120,118 B2

BACKLIGHT MODULE HAVING QUANTUM DOT AND MANUFACTURING METHOD THEREOF

CROSS-REFERENCE TO RELATED PATENT APPLICATION

This application claims priority to and the benefit of, pursuant to 35 U.S.C. § 119(a), patent application Serial No. 105135895 filed in Taiwan on Nov. 4, 2016. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an optical enhanced unit, and more particularly to a backlight module having a quantum dot material.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the continuous development of display technologies, regarding mass production scale and product application popularity, liquid crystal display (LCD) devices are the mainstream of flat-panel display technologies. In a LCD device, a backlight module that provides a backlight source required for the LCD device plays a very important role.

Generally, a light-emitting diode (LED) light-bar that is formed of a plurality of LEDs is disposed in a backlight module of a LCD device, and is used to provide a backlight source required for the LCD device. Owing to a panel module of the LCD device is not capable of emitting light, a function of the backlight module is to supply light that has sufficient brightness and uniform distribution, to enable the LCD device to normally display an image. Nowadays, LCD devices have been widely applied in electronic products such as monitors, notebook computers, digital cameras, and projectors that have potential of growth. Therefore, the demand for backlight modules and related parts and components of the backlight modules keeps growing accordingly.

A quantum dot technology gradually becomes mature. Quantum dots have a characteristic of wide color gamut, and therefore are applied in an LCD device to increase color saturation of the LCD device, so that an image has a better display effect. However, quantum dots of a common quantum dot display devices are highly susceptible to heat, resulting in reduced light-emitting efficiency.

Therefore, how to efficiently use the quantum dot technology to implement a wide-color gamut display device and still maintain brightness of a backlight module in order to display high image quality is one of the important research and development issues, and also becomes an aspect where improvement is to be made in related fields.

SUMMARY

The present invention is to provide a backlight module, so as to further improve wide color gamut and brightness of a display device in order to ensure the uniformity of a displayed image.

An embodiment of the present invention discloses a backlight module, which has a light guide part, a light source, a reflection part, a grating, a prism sheet, a diffuser, a wavelength-conversion material, and a reflection layer. An incident surface of the light guide part is located on a lateral side between a bottom surface and a top surface. The light source is disposed on a side of the incident surface. The reflection part is disposed along the bottom surface of the light guide part. The grating is disposed along the top surface of the light guide part, and has a plurality of bright zones and a plurality of dark zones disposed with an equal pitch. A surface, next to the grating, of the prism sheet has a plurality of micro structures. An angle is formed between a first wall and a second wall of a horizontal cross-section of a micro structure. The diffuser has a cave to enable the wavelength-conversion material to be disposed in the cave. The reflection layer is formed at a flat portion of the diffuser.

Another embodiment of the present invention discloses an optical enhanced unit and a manufacturing method thereof, so as to improve conversion efficiency of lights of a display device, thereby further improving color saturation of an image.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 6A is an enlargement diagram of a light emitting path in a prism sheet according to an embodiment of the present invention.

DETAILED DESCRIPTION

Detailed description is provided below with reference to the embodiments and the accompanying drawings. However, the provided embodiments are not used to limit the scope of the present invention. The description of structures and operations are not used to limit an execution sequence of the operations. Any apparatus having equivalent efficacy produced by using a structure of recombined elements falls within the scope of the present invention. In addition, the drawings are only used for the purpose of description and are not drawn by original sizes. For ease of understanding, the same elements are described by using the same symbols in the following description.

The terms "first", "second" and the like as used herein are used for distinguishing between similar elements or operations and not necessarily for describing a sequence, either temporally, spatially, in ranking or in any other manner.

In the accompanying drawings as used herein, if proportion relationships are not specifically described in the specification or the accompanying drawings, the accompanying drawings are not used to limit proportion relationships in the present invention and are merely for simple illustration.

Figure 1:
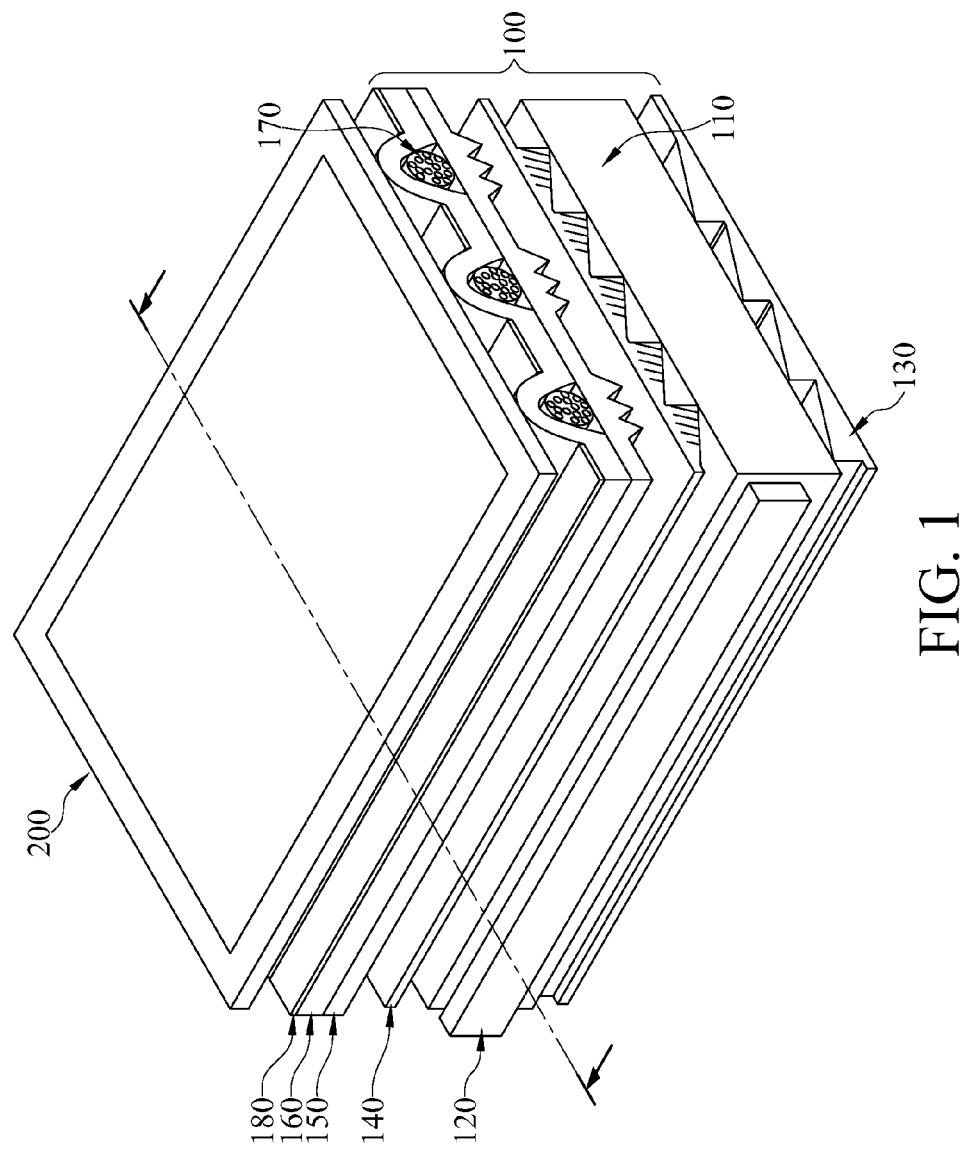
FIG. 1 is a schematic diagram of a backlight module according to an embodiment of the present invention.
Figure 2:
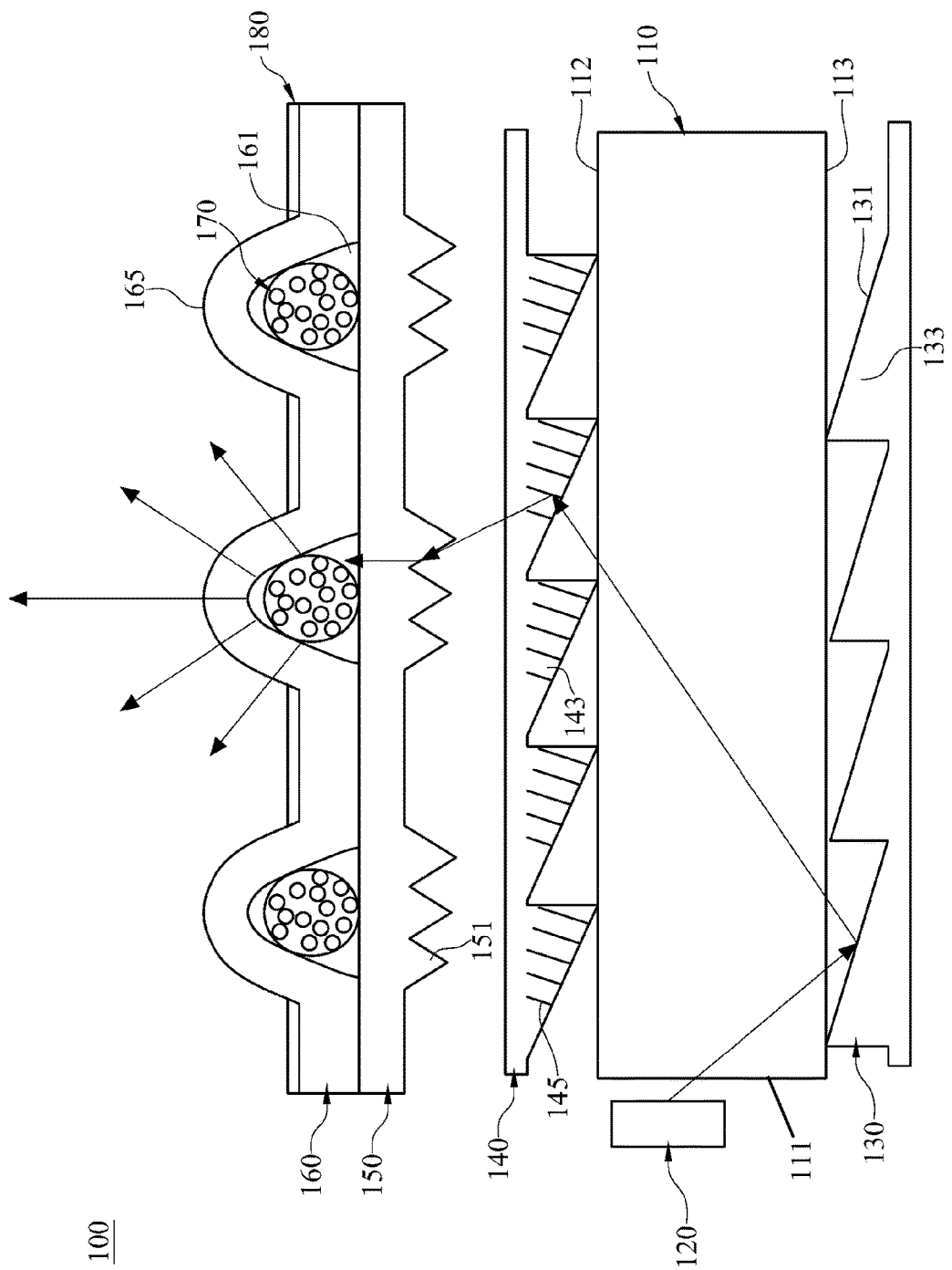
FIG. 2 is a cross-section diagram of a backlight module according to an embodiment of the present invention.

Refer to both FIG. 1 and FIG. 2. FIG. 1 is a schematic diagram of a backlight module according to an embodiment of the present invention. FIG. 2 is a schematic cross-section diagram of a backlight module according to an embodiment of the present invention. A backlight module 100 includes a light guide part 110, a light source 120, a reflection part 130, a grating 140, a prism sheet 150, and a diffuser 160. The light guide part 110 has an incident surface 111, a top surface 112, and a bottom surface 113. The bottom surface 113 is opposite the top surface 112, and the incident surface 111 is located between the top surface 112 and the bottom surface 113. A light guide medium inside the light guide part 110 may include air, polymethyl methacrylate (PMMA), glass, or a material that can be used to guide light. The light source 120 is disposed along the incident surface 111, which is configured to emit light, so that the light of the light source 120 may pass through the incident surface 111. The light source 120 may emit monochromatic light, for example, may emit blue light or ultraviolet light. In a preferred embodiment, a wavelength of the light source 120 may be substantially 450 nanometers (nm).

The reflection part 130 is next to the bottom surface 113 of the light guide part 110. The reflection part 130 has a reflection surface 131, and is configured to reflect the light in order to extend a scattering path of the light, thereby achieving the efficacy of increasing the uniformity of light. The reflection part 130 may include a plurality of micro structures 133 that is convex or concave to form the reflection surface 131. The grating 140 is disposed along the top surface 112 of the light guide part 110. A surface next to the light guide part 110 may include a plurality of micro structures 141. The micro structures 141 may have an angle from a surface of the grating 140 to form the surface of the grating 140. The micro structures 141 include a plurality of bright zones 143 and a plurality of dark zones 145. Each dark zone 145 has substantially equal pitches D, so that light passes the grating 140 through a diffraction path. Because light that passes through the grating 140 come from various angles, angles of the dark zones 145 of the grating 140 may include various angles, to enable outgoing light to achieve the efficacy of uniformity. The reflection part 130 may be a multi-layer film reflection sheet or a white-reflection sheet or may have a surface applied with a reflection material such as gold, silver, aluminum or an alloy, and the present invention is not limited thereto.

The prism sheet 150 is disposed along a plane of the grating 140. The prism sheet 150 has two opposite surfaces. A surface next to the grating 140 includes a plurality of micro structures 151. A horizontal cross-section of each micro structure 151 includes a first wall and a second wall. An angle φ less than 90 degrees is formed between the first wall and the second wall. The other opposite surface is a plain surface. The micro structures 151 may be a plurality of pyramid-shaped structures or may be a plurality of triangular-prism-shaped structures, which belong to the scope covered by the present invention as long as an included angle φ between the two opposite walls is fixed, so that light that passes through the prism sheet 150 may emit in a direction perpendicular to the plane (that is, a normal direction of the prism sheet). An included angle φ between the two opposite walls in a preferred embodiment of the present invention may be 68 degrees. However, the present invention is not limited thereto, and a suitable angle φ may be designed according to user's design.

The diffuser 160 has a first surface and a second surface. The first surface is disposed attached to a plane of the prism sheet 150, and the first surface has a plurality of caves 161, used to dispose a wavelength-conversion material 170. The wavelength-conversion material 170 may include a quantum dot material or a phosphor material or the like to enable light to pass through the wavelength-conversion material 170 to change a characteristic of the light. For further explanation, this quantum dot or phosphor material may be packaged in a vacuum glass tube or a plastic tube to achieve the efficacy of protection. The second surface is opposite the first surface, and a plurality of convex portions 165 is formed corresponding to the caves 161 of the first surface on the second surface, and the rest second surface forms a flat portion 163, on which a reflection layer 180 is applied or covered. The diffuser 160 may be made of materials such as acrylic particles, an acrylic emulsion, and a polyester (PET) film. The reflection layer 180 may be made of gold, silver, aluminum or metal materials with a reflection effect. A display panel 200 is disposed on the backlight module 100. The light enters the display panel 200 by using the backlight module 100.

Figure 3A:
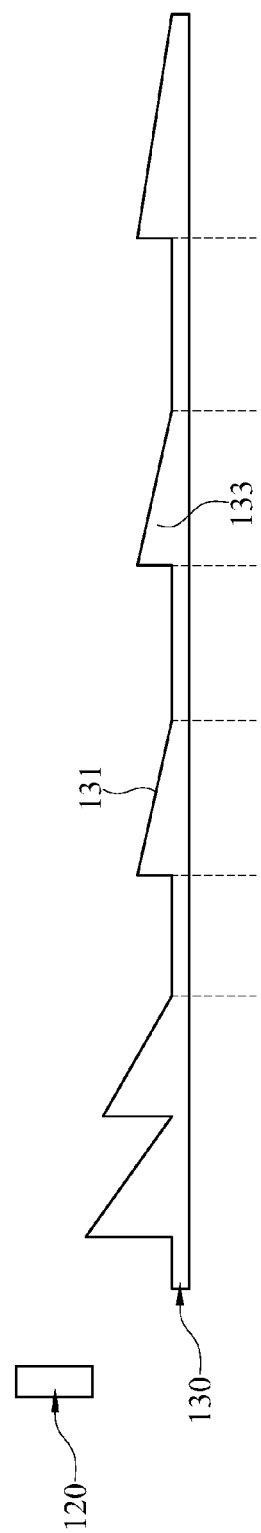
FIG. 3A is an enlargement diagram of a reflection part according to an embodiment of the present invention.

Refer to FIG. 3A in combination with FIG. 2. FIG. 3A is an enlargement diagram of the reflection part 130 according to an embodiment of the present invention. As shown in FIG. 3A, the reflection part 130 may include a plurality of micro structures 133 having an equal pitch and size or a plurality of micro structures 133 having different pitches and sizes that is convex or concave at the reflection part 130 to form the reflection surface 131. In other words, an included angle may be formed between a reflection surface 133 of the micro structures 133 and a surface of the reflection part 130 to form a chamfer. The heights, widths, angles, and pitches of the micro structures 133 may be designed to be different or with a distance from a light source changes, the angles of the micro structures 133 may be gradually adjusted according to the distance from the light source, so as to extend a scattering path of the light and improve the uniformity of a light-emitting surface. In another embodiment of the present invention, the reflection part 130 may also be opposite the light guide part 110 and have a chamfered reflection structure. Any reflection structure that can be used to reflect light to extend the scattering path of the light falls within the scope covered by the present invention.

Figure 3B:
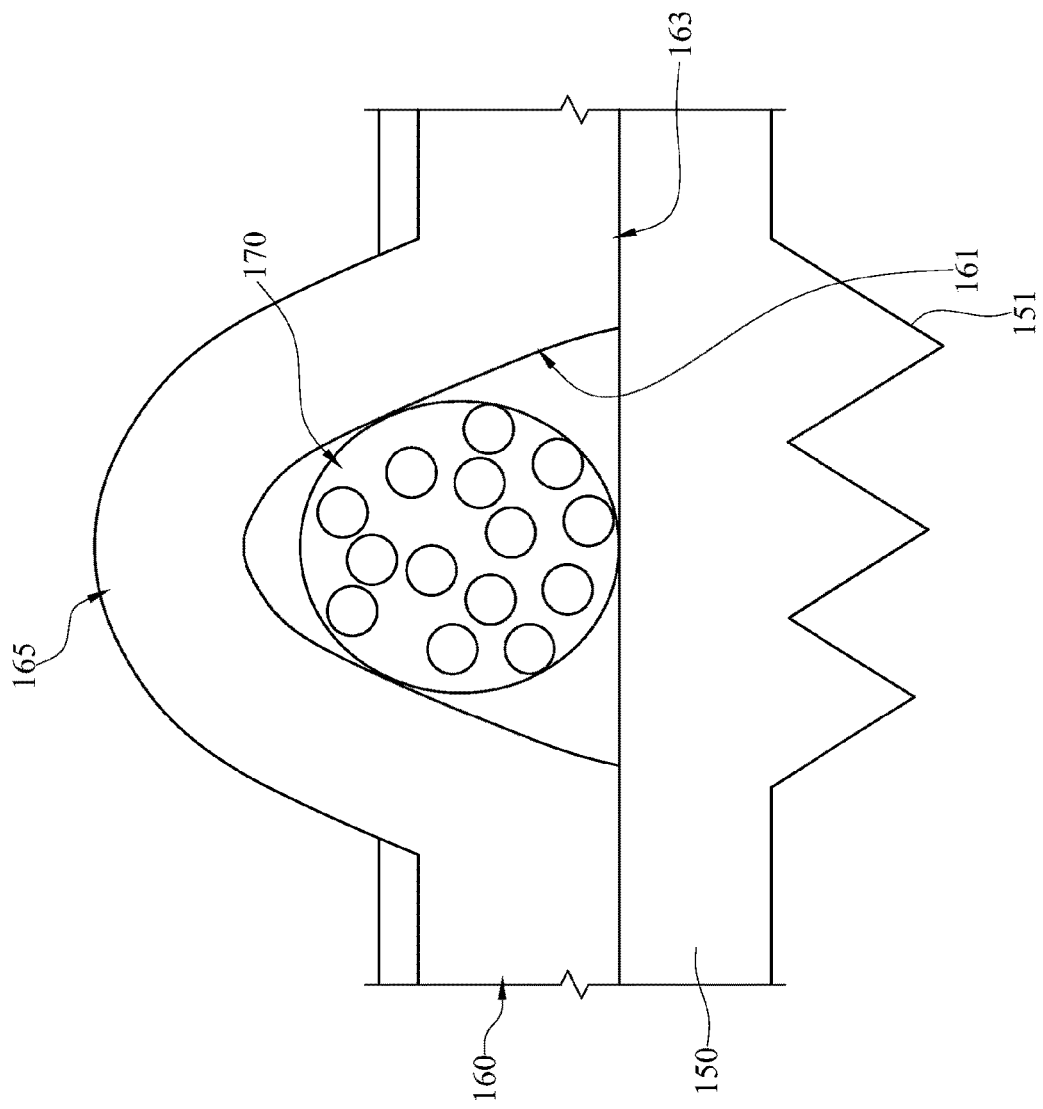
FIG. 3B is an enlargement diagram according to an embodiment of the present invention.

Refer to FIG. 3B in combination with FIG. 2. FIG. 3B is an enlargement diagram of the prism sheet 150 and the diffuser 160 according to an embodiment of the present invention. As shown in FIG. 3B, the micro structures 151 of the prism sheet 150 are mainly disposed below openings of the caves 161 of the diffuser 160, so that light that passes through the prism sheet 150 may enter the diffuser 160 in a direction perpendicular to a plane (that is, a normal direction of the prism sheet), and further enter the wavelength-conversion material 170.

Figure 4A:
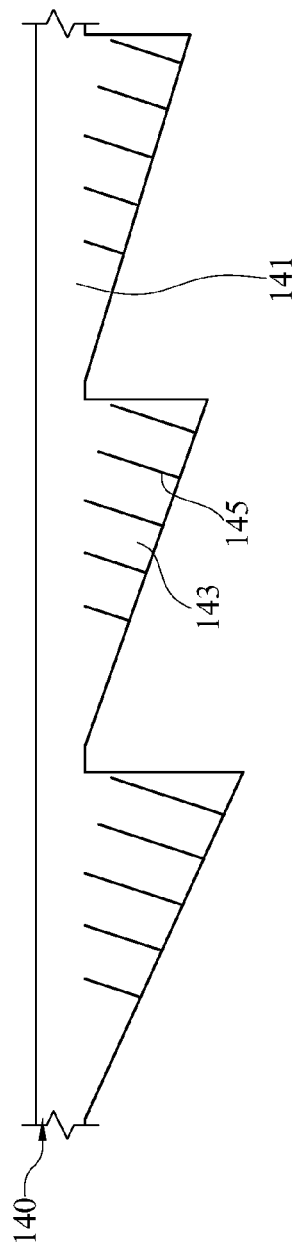
FIG. 4A is a cross-section diagram of a grating according to an embodiment of the present invention.

Refer to FIG. 4A in combination with FIG. 2. FIG. 4A is a cross-section diagram of a grating according to an embodiment of the present invention. As shown in FIG. 4A, the surface of the grating 140 includes a plurality of micro structures 141. The micro structures 141 may have an angle from the surface of the grating 140 and be formed on the surface of the grating 140. Angles of the micro structures 141 may be equal or unequal. Because light is emitted to the grating 140 from all directions, when a plurality of micro structures 141 having various angles is disposed, an objective of fully utilizing scattered lights can be achieved. Each micro structure 141 may include a plurality of bright zones 143 and a plurality of dark zones 145. The bright zones 143 may be zones that allow lights to pass through. For example, a plurality of slits forms the bright zones 143, and pitches D between any two adjacent slits are substantially equal. That is, the plurality of bright zones 143 or the plurality of dark zones 145 is disposed with an equal pitch.

Figure 4B:
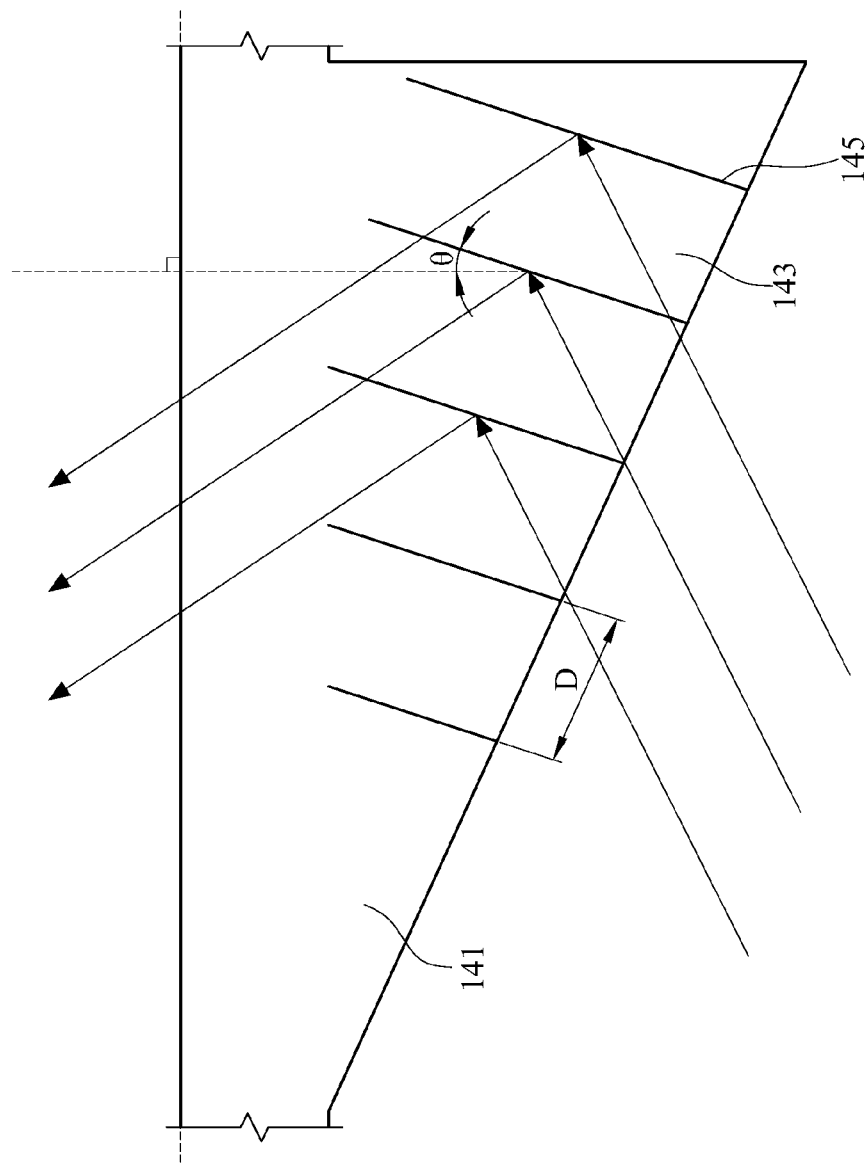
FIG. 4B is a schematic diagram of a light emitting path according to FIG. 4A.

Next, refer to FIG. 4B in combination with FIG. 4A. FIG. 4B is a schematic diagram of the light emitting path according to FIG. 4A. For light of incident light passes through the grating 140, according to Bragg's law, the light that enters the grating 140 may pass through the grating 140 via a diffraction path at a diffraction angle θ, to enable the light to exit in a direction perpendicular to a top surface of the grating 140. The grating 140 may be a diffraction grating that subjects the amplitude or phase (or both) of the incident light to periodic spatial modulation. The grating 140 may also be a reflection grating or a transparent grating, and the present invention is not limited thereto. Any grating that enables light to exit at a same diffraction angle falls within the scope of the present invention. A formula of Bragg's law is as follows:

2D sin θ=nλ, where n is a positive integer, and light of incident light has a wavelength λ. Because light emitted by the light source 120 is monochromatic light, the wavelength λ is a constant value, but an incident angle is not a particular single angle. Outgoing light that is intended to exit the grating has a particular angle, so that adjustment may be performed by adjusting a pitch D or an inclined angle of the grating, so as to decide angles of light and outgoing light of the grating 140.

Figure 5:
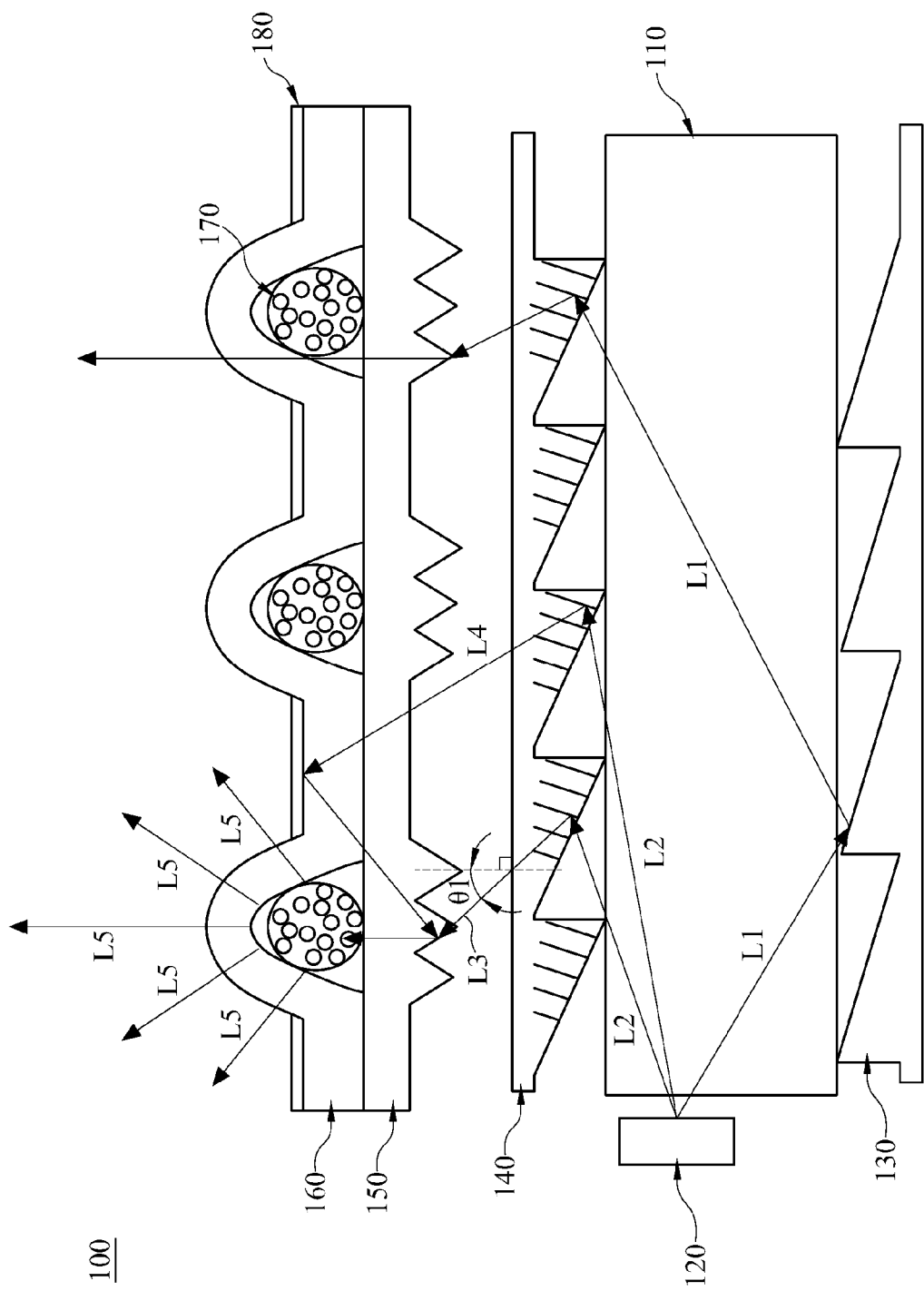
FIG. 5 is a schematic diagram of a light emitting path according to an embodiment of the present invention.

FIG. 5 is a schematic diagram of a light emitting path according to an embodiment of the present invention. A light path of the backlight module 100 and a method for operating the backlight module are described below. It is first assumed here that the light guide part 110 is air. As shown in FIG. 5, the light source 120 emits light L1 and light L2. The light L1 passes through the light guide part 110 and is reflected to the light guide part 110 by the reflection part 130, so as to extend a scattering path of light. The light L2 passes through the light guide part 110 and reaches the grating 140, so that from light that passes through the grating 140, light L3 or light L4 having a diffraction angle θ1 is emitted via a diffraction path. For an embodiment of the present invention, an included angle between the light L3 and the plane of the grating 140 is 27 degrees. However, the present invention is not limited thereto, and a suitable diffraction angle θ may be designed according to user's design.

Next, a trajectory of the light L3 is described first. Refer to FIG. 5 in combination with FIG. 6A. FIG. 6A is an enlargement diagram of a light emitting path of a prism sheet according to an embodiment of the present invention. The light L3 vertically enters the prism sheet 150 along a path perpendicular to walls of the micro structures 151 of the prism sheet 150, to enable the light L3 to enter other walls of the micro structures 151 to cause the light L3 to be deflected, so that according to a deflection path, the light L3 enters the caves 161 of the diffuser 160 in a direction perpendicular to the plane, and further reaches the wavelength-conversion material 170. After passing through the wavelength-conversion material 170, light characteristics of the light L3 are changed. The prism sheet 150 is attached to the wavelength-conversion material 170, so that the light L3 vertically enters the wavelength-conversion material 170 according to the deflection path, thereby improving conversion efficiency of lights. Moreover, monochromatic light passes through the wavelength-conversion material to cause the characteristics including wavelengths and light-emitting angles of lights to change, and the thickness of the backlight module 100 is reduced.

Figure 6B:
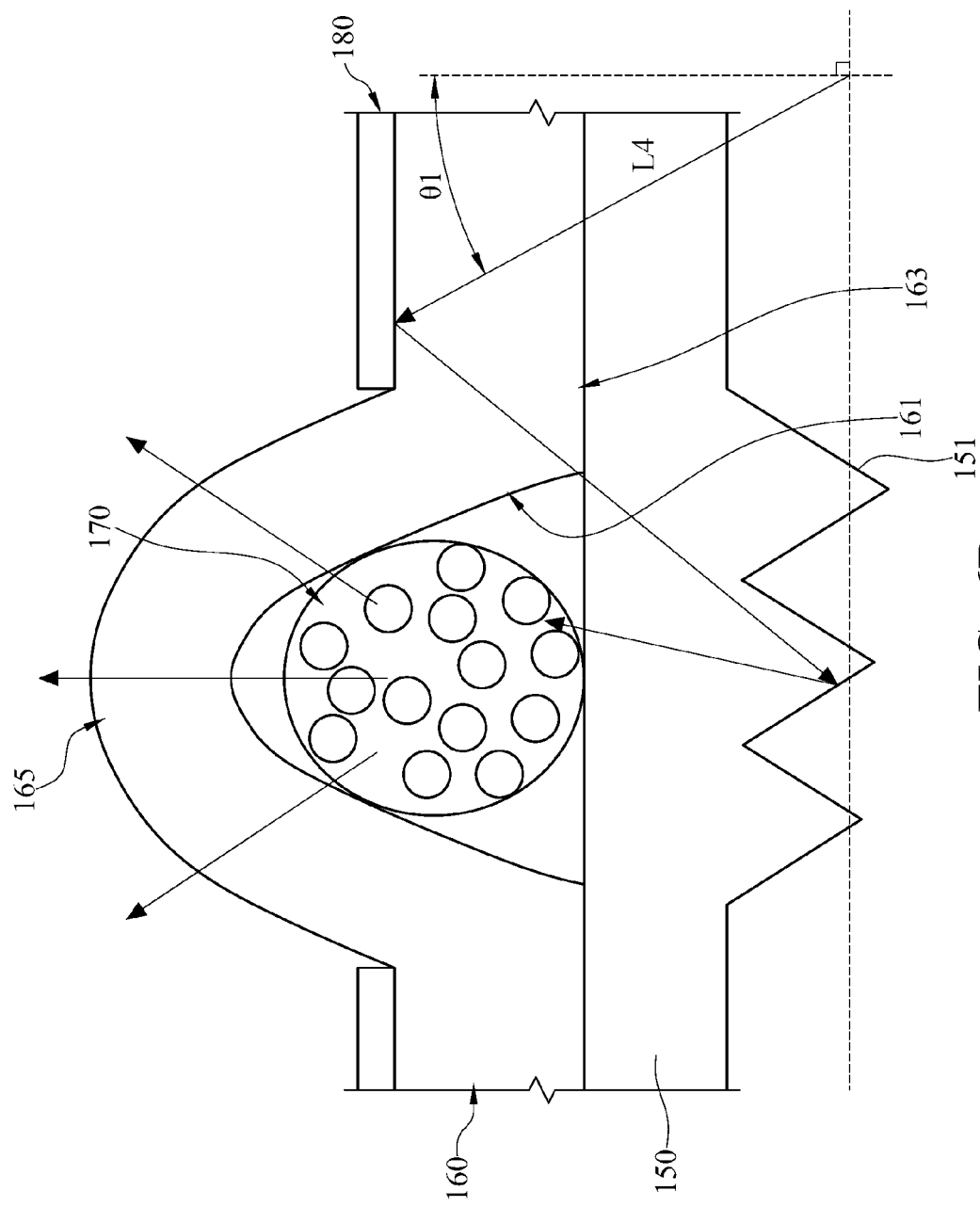
FIG. 6B is an enlargement diagram of a light emitting path in a prism sheet according to an embodiment of the present invention.

A trajectory of the light L4 is then described. Refer to FIG. 5 in combination with FIG. 6B. FIG. 6B is an enlargement diagram of a light emitting path of a prism sheet according to an embodiment of the present invention. When the light L4 enters the flat portion 163 of the diffuser 160, because the flat portion 163 covers the reflection layer 180, the light L4 may enter walls of the micro structures 151 along a reflection path to cause the light L4 to be deflected, so that according to the deflection path, the light L4 enters the wavelength-conversion material 170 that is disposed in the caves 161 of the diffuser 160. After passing through the wavelength-conversion material 170, light characteristics of the light L4 are changed. By using a manner in which the flat portion 163 covers the reflection layer 180, the light L4 can be reflected and recycled, thereby improving conversion efficiency of lights.

The light characteristics may be a wavelength. For example, the light L3 enters the wavelength-conversion material 170 that contains a quantum dot material, so that the light L3 is excited in the wavelength-conversion material 170, to emit light having a wavelength γ. Alternatively, the light L3 may enter the wavelength-conversion material 170 that contains a phosphor material, so that the light L3 is converted in the wavelength-conversion material 170 to emit light having a wavelength γ. For the wavelength γ, there may be different wavelength designs by designing a band gap of an energy level of a quantum dot material. For example, in a preferred embodiment of the present invention, light L5 may be white light.

Figure 7:
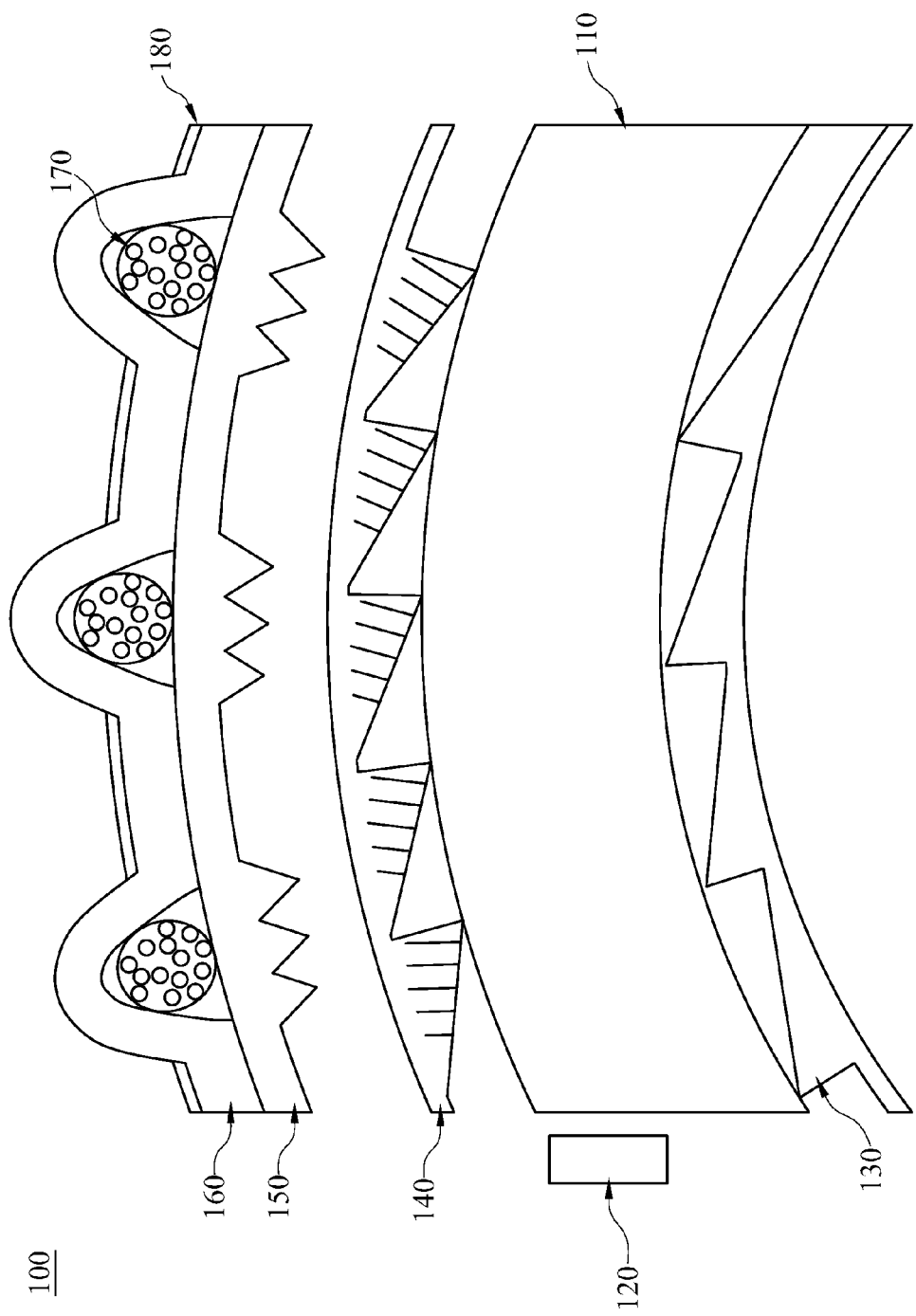
FIG. 7 is a cross-section diagram of a backlight module according to another embodiment of the present invention.

Refer to FIG. 7. FIG. 7 is a cross-section diagram of a backlight module according to another embodiment of the present invention. The backlight module 100 disclosed in the present invention may also be applied to a flexible display device. Because in the backlight module 100 disclosed in the present invention, optical elements are stacked to design a suitable light path of light, to enable the backlight module 100 to emit a uniform light without needing to pass through too many films. Moreover, the optical elements used in the backlight module 100 may all be elastic and bendable materials, and therefore, the backlight module 100 is suitable for flexible display devices.

Figure 8:
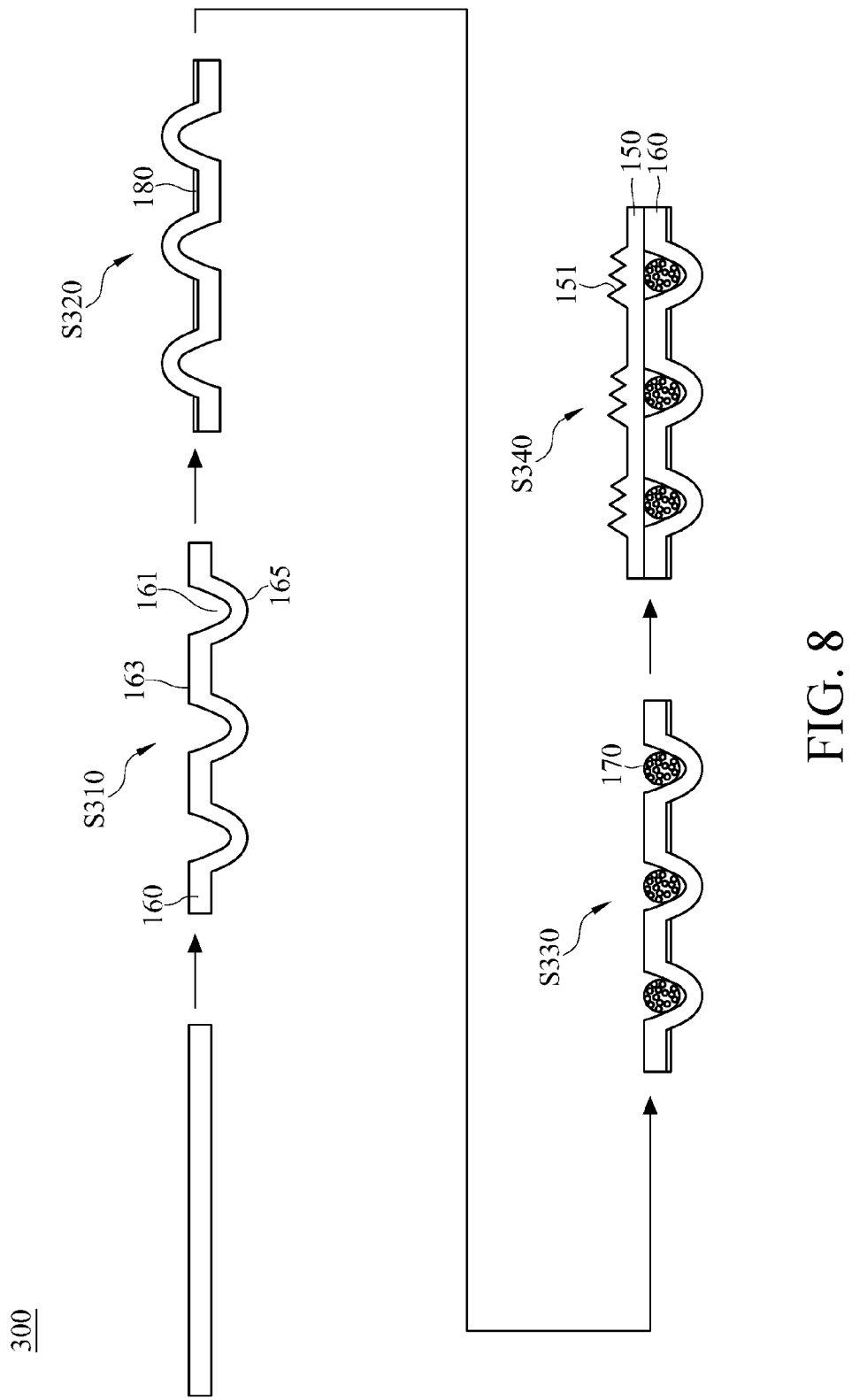
FIG. 8 is a manufacturing process of the optical enhanced unit according to the embodiment of the present invention.

FIG. 8 is a manufacturing process of the optical enhanced unit according to an embodiment of the present invention. A fabrication method 300 of the optical enhanced unit is described below. The optical enhanced unit includes a prism sheet 150, a diffuser 160, a wavelength-conversion material 170, and a reflection layer 180. Step S310: Form caves 161 on a surface of the diffuser 160 in a molding or thermoplastic manner, so that a convex portion 165 and a flat portion 163 are formed on another surface corresponding to the caves 161. The thickness of the convex portion 165 of the diffuser 160 may be equal to or may be not equal to the thickness of the flat portion 163. Step S320: Apply a reflection material on the flat portion 163 of the diffuser 160 to form the reflection layer 180. Step S330: Fill the wavelength-conversion material 170 in the caves 161. Step S340: Bond the diffuser 160 and the prism sheet 150, to obtain the optical enhanced unit. The reflection material may be gold, silver, aluminum or a metal material having a reflection effect. In terms of any dimension of space of three-dimensional space involving length, width, and height of sizes, quantum dots contained in the wavelength-conversion material 170 may be nano-crystalline particles that have such sizes less than 100 nm.

The present invention provides a light-weight and thin backlight module in which a quantum dot material is applied. In a preferred embodiment, the display device of the present invention is a flat-panel display device having a backlight module, for example, a LCD device, a plasma display device, and an electro-wetting display device. However, in another embodiment, the display device of the present invention may also be a display device of another type.

The present invention provides a light-weight and thin backlight module in which a quantum dot is applied. In a preferred embodiment, the backlight module may be implemented to a display device having a flexible substrate.

According to the backlight module disclosed in the present invention, a grating and an optical enhanced unit are disposed in the backlight module, so that light guided from a light guide part may pass through the grating to emit lights having a same emitting angle, to enable the lights to vertically enter a wall of a prism sheet. Next, the lights move along a deflection path to enter a wavelength-conversion material, so that light characteristics of the lights can be changed in the wavelength-conversion material, to emit different lights that have characteristics different from those from a light source. Moreover, a reflection part is disposed, lights are uniformly scattered, thereby further improving optical uniformity and brightness of the backlight module.

In addition, for the backlight module disclosed in the present invention, the light guide part may be formed of air or a light-weight and thin light guide medium, so that not only the uniformity and brightness of the backlight module are greatly improved, but also the backlight module further becomes thinner, so as to meet a light-weight and thin demand of the backlight module at the same time.

In conclusion, for the backlight module disclosed in the present invention, an optical design is used to improve optical intensity and optical uniformity and at the same time meet a light-weight and thin demand of the backlight module.

The present invention is disclosed through the foregoing embodiments; however, these embodiments are not intended to limit the present invention. Various changes and modifications made without departing from the spirit and scope of the present invention shall fall within the protection scope of the present invention. The protection scope of the present invention is subject to the appended claims.

What is claimed is:

1. A backlight module, comprising:
   a light guide part, comprising an incident surface, a bottom surface, and a top surface, wherein the top surface and the bottom surface are opposite surfaces of the light guide part, and the incident surface is located at a lateral side between the bottom surface and the top surface;
   a light source, disposed on a side of the incident surface, being configured to emit light;
   a reflection part, disposed adjacent to the bottom surface of the light guide part;
   a grating, disposed along the top surface of the light guide part, comprising a plurality of bright zones and a plurality of dark zones, and the bright zones have equal pitches;
   a prism sheet, disposed on a plane of the grating, wherein the prism sheet has two opposite surfaces, one of the surfaces next to the grating comprises a plurality of first micro structures, a horizontal cross-section of each first micro structure comprises a first wall and a second wall, a first angle being formed between the first wall and the second wall, and the other surface is a plain surface;
   a diffuser, having a first surface and a second surface, wherein
   the first surface comprises a cave; and
   the second surface comprises a convex portion that are formed corresponding to the cave and a flat portion;
   a wavelength-conversion material, disposed in the cave of the diffuser; and
   a reflection layer, formed at the flat portion of the second surface.

2. The backlight module according to claim 1, wherein the light passes through the grating via a path that has a second angle from the plane of the grating.

3. The backlight module according to claim 1, wherein the light passes through the grating via a diffraction path, and passes through the prism sheet according to a deflection path.

4. The backlight module according to claim 1, wherein the first angle is substantially 68 degrees.

5. The backlight module according to claim 1, wherein the reflection part comprises a plurality of second micro structures, formed on the reflection part with an equal pitch or different pitches.

6. The backlight module according to claim 1, wherein the light source is a monochromatic light source.

7. The backlight module according to claim 1, wherein the light guide part comprises: air or a light guide medium.

8. The backlight module according to claim 1, wherein the grating comprises a plurality of slits to form the bright zones, and the slits are with equal pitches.

9. The backlight module according to claim 1, wherein the grating further comprises a plurality of third micro structures.

10. The backlight module according to claim 1, wherein the wavelength-conversion material comprises: quantum dot materials or phosphor materials.

11. The backlight module according to claim 1, wherein the prism sheet further comprises a flat portion, disposed corresponding to the cave.

12. The backlight module according to claim 2, wherein the second angle is substantially 27 degrees.

13. The backlight module according to claim 5, wherein the second micro structures are convex or concave at a surface of the reflection part.

14. The backlight module according to claim 6, wherein the light source emits blue light or ultraviolet light.

15. The backlight module according to claim 10, wherein the quantum dot materials have different radii.

16. An optical enhanced unit, comprising:
   a diffuser, having a first surface and a second surface, wherein
   the first surface comprises a cave; and
   the second surface comprises a convex portion and a flat portion that are formed corresponding to the cave;
   a wavelength-conversion material, disposed in the cave of the diffuser;
   a reflection layer, formed at the flat portion of the second surface; and
   a prism sheet, having two opposite surfaces, wherein one of the surfaces is a first surface that is planar and attached to the diffuser,
   wherein a plurality of first micro structures is formed on the other surface, horizontal cross-sections of the first micro structures are triangles, and a horizontal cross-section of each first micro structure comprises a first wall and a second wall.

17. A manufacturing method of an optical enhanced unit, applicable to the optical enhanced unit according to claim 16, wherein the manufacturing method comprises:
   forming the cave on the first surface of the diffuser in a molding or thermoplastic manner, so that the convex portion and the flat portion are disposed on the second surface corresponding to the cave;
   applying a reflection material on the flat portion of the second surface of the diffuser to form the reflection layer;
   filling a wavelength-conversion material in the cave; and
   bonding the diffuser and the prism sheet, to form the optical enhanced unit.

* * * * *